4,249,795

United States Patent [19]

Jones

[11] 4,249,795
[45] Feb. 10, 1981

[54] SCOPE FOR VIEWING THE INTERNAL SURFACE OF A BORE OR SIMILAR CAVITY

[76] Inventor: Ira D. Jones, 1023 S. Main St., South Bend, Ind. 46601

[21] Appl. No.: 24,695

[22] Filed: Mar. 28, 1979

[51] Int. Cl.³ .................................................. G02B 5/14
[52] U.S. Cl. ................................... 350/96.26; 356/241
[58] Field of Search ............... 350/96.26, 96.25, 96.10; 128/6; 356/241

[56] References Cited

U.S. PATENT DOCUMENTS

| 2,539,828 | 1/1951 | Goldis et al. | 350/96.10 |
| 2,987,960 | 6/1961 | Sheldon | 350/96.26 |
| 3,357,433 | 12/1967 | Fourestier et al. | 350/96.26 |
| 3,724,922 | 4/1973 | Jones | 350/96.26 |
| 4,135,824 | 1/1979 | Jones | 356/241 |

*Primary Examiner*—Stewart J. Levy
*Attorney, Agent, or Firm*—Oltsch, Knoblock & Hall

[57] ABSTRACT

A scope for viewing the internal surfaces of bores or similar cavities which includes a rod of optically clear material having an image transmitting end, a light gathering end, and a viewing surface intermediate to these ends. An optical surface is formed internally of the rod at an angle to the axis of the rod and serves to reflect the image of the cavity surface out of the rod for viewing.

11 Claims, 10 Drawing Figures

SCOPE FOR VIEWING THE INTERNAL SURFACE OF A BORE OR SIMILAR CAVITY

SUMMARY OF THE INVENTION

This invention relates to a device, sometimes known as a bore scope, for viewing the internal surfaces of a bore or similar cavity.

In the scope of this invention a rod of optically clear material is provided and formed with a light gathering end, an image transmitting end, and a viewing surface intermediate these ends. An optical surface is formed internally of the scope and serves to reflect the image of the cavity surface laterally from the rod for viewing. The image transmitting end may include first and second optical surfaces which are disposed at a 45° angle to each other and which serve to direct image producing light, as it passes through the rod, onto the internal cavity surface where the surface is illuminated and the image thereof is transmitted to the viewing surface of the rod. As an alternative, the image transmitting end may be formed perpendicular to the axis of the rod for viewing axially into the bore. The rod includes a light gathering end which has an axial light gathering surface. The light gathering end may include provision for the attachment of a light source or conduit, for example a light bulb or a fiber optic cable, proximate to the light gathering surface.

Accordingly, it is an object of this invention to provide a scope of economical and simple construction which can be utilized to view the internal surface of a bore or similar cavity.

It is another object of this invention to provide a bore scope which can be utilized to view longitudinally into a bore or similar cavity.

It is another object of this invention to provide a scope which is for viewing the internal surface of a bore or similar cavity in an object and which has a shank which is insertable into the bore.

Another object of this invention is to provide a scope which is for viewing the internal surface of a bore or similar cavity in an object and which includes a light gathering end.

Another object of this invention is to provide a scope which is for viewing the internal surface of a bore or similar cavity in an object and which will provide an adequate amount of light for illumination and for forming the image to be viewed.

It is another object of this invention to provide a scope which is for viewing the internal surface of a bore or similar cavity in an object and which includes a viewing surface providing a view of the image which is transmitted to the viewing surface perpendicularly to the axis of the scope.

Other objects of this invention will become apparent from the following description.

DESCRIPTION OF THE PREFERRED EMBODIMENT

The preferred embodiments illustrated are not intended to be exhaustive nor to limit the invention to the precise forms disclosed. They are chosen and described in order to explain the principles of the invention and its application and practical use to thereby enable others skilled in the art to best utilize the invention.

Figure 4:
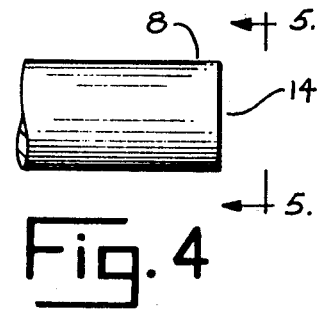
FIG. 4 is a partial view of the image transmitting end of the shank showing another embodiment of this invention.

The scope illustrated in FIGS. 1-10 is rod shaped and includes a head 2, a shank 4, and an eye piece 6. Shank 4 is preferably cylindrical and of rigid construction, although it is to be understood that the shank may have a cross sectional configuration which is other than circular, such as square or rectangular, and may be formed of flexible material. Head 2, shank 4, and eye piece 6, are formed of an optically clear material, such as acrylic resin, which is sold under the names "Lucite" and "Plexiglass". Shank 4 has an image transmitting end 8. Image transmitting end may include a first optical surface 10 which extends traversely of the shank at an angle of 45° to the axis thereof. A second optical surface 12 is formed in the external cylindrical surface of shank 4 and is oppositely positioned from first optical surface 10. The included angle between optical surfaces 10 and 12 is 45°. Both surfaces 10 and 12 are flat. Image transmitting end 8 may alternatively include an optical flat 14, as shown in FIG. 4. Optical flat 14 is formed generally perpendicular to the axis of shank 4.

Head 2 includes a light gathering end 16 having a light gathering surface 18. Eye piece 6 includes viewing surface 20. An internal optical surface 22 is formed within head 2 at a 45° angle to the rod axis, paralleling surface 10. Internal optical surface 22 is formed at the end of shank 4 opposite to image transmitting end 8. In association with internal optical surface 22 is an internal optical surface 24 formed at a 45° angle to surface 22. Optical surface 24 is adjacent to and in visual alignment with eye piece 6.

An internal cavity 26 is formed in head 2. Internal cavity 26 has an internal cavity surface 28, the contour of which may vary. Light incident to light gathering surface 18, as represented by arrows 30, is transmitted across the surface 18 and into the acrylic resin of the head 2. The outer surface 36 of head 2 is tapered toward shank 4 of the rod. This causes the light entering head 2 through surface 18 to be directed into shank 4.

The angle of taper surface 36 and the contour and angulation of internal cavity surface 28 are such that the angle of incidence between light rays 30 and the surfaces will exceed the critical angle of the material from which the scope is constructed so that the light rays will be reflected internally to the scope. For an acrylic resin material such a critical angle is 42°. The light rays are reflected internally along the shank 4 toward optical surface 10 at the end thereof. The rays, when striking surface 10, are reflected laterally through optical surface 12 onto the internal surface of the cavity. The image of the internal surface of the cavity passes through optical surface 12 where it is reflected longitudinally along shank 4 by optical surface 10. As illustrated in FIG. 4, the end of shank 4 may terminate in an image transmitting end 8 which has an optical flat 14. In this case, the light is transmitted across optical flat 14 in a generally axial direction into the cavity under observation and the image is transmitted longitudinally along shank 4 directly. The image transmitted by shank 4 is incident upon internal optical surface 22 and is reflected thereby through optical surface 24 into eye piece 6 where it is viewed at surface 20 by the observer.

Figure 1:
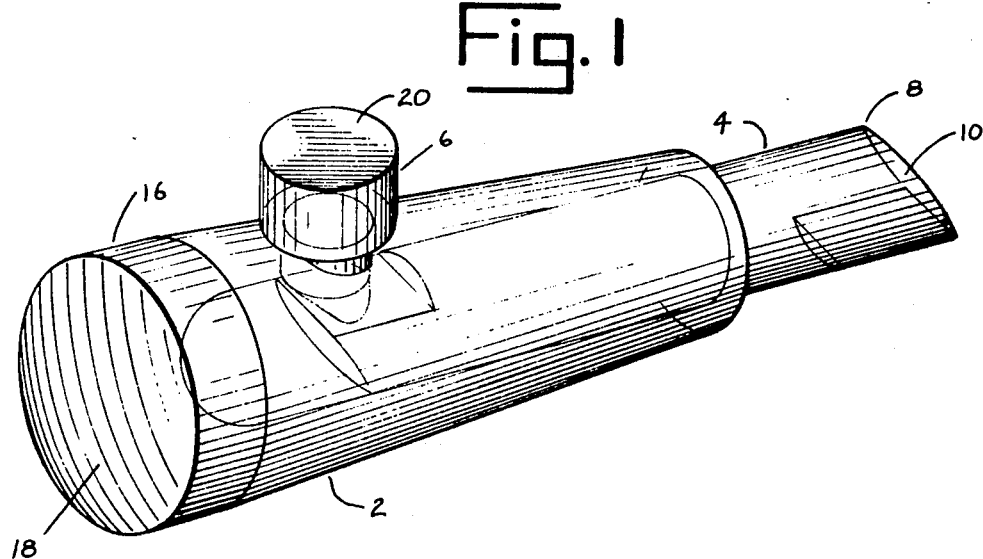
FIG. 1 is a perspective view of one embodiment of the scope of this invention.
Figure 2:
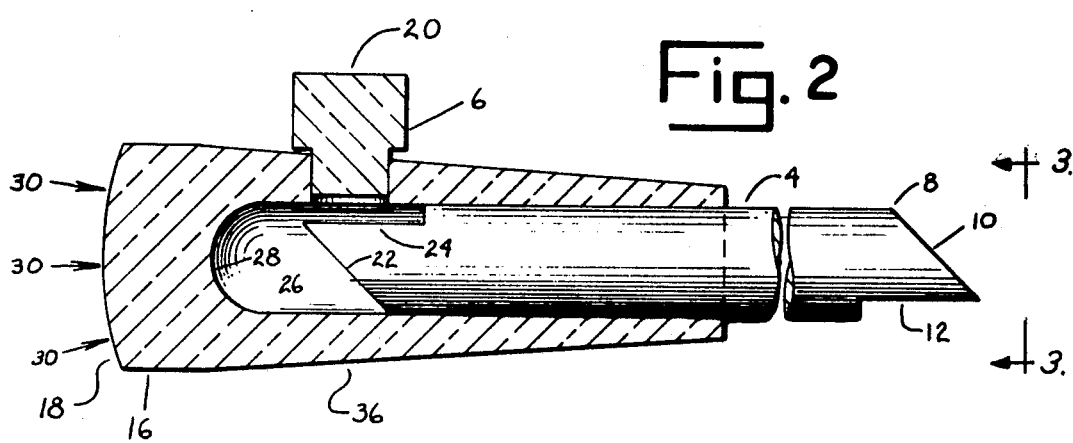
FIG. 2 is a longitudinal sectional view of the scope of FIG. 1.
Figure 3:
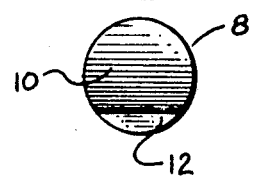
FIG. 3 is an end view taken along the line 3—3 of FIG. 2 and looking in the direction of the arrows.
Figure 5:
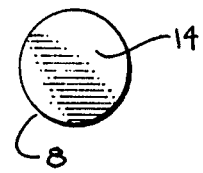
FIG. 5 is an end view of the shank end shown in FIG. 4 taken along the line 5—5 and looking in the direction of the arrows.
Figure 6:
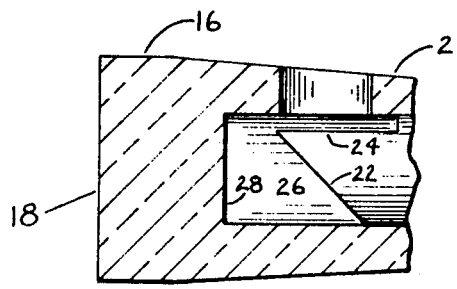
FIG. 6 is a partial sectional view of yet another embodiment of this invention.
Figure 7:
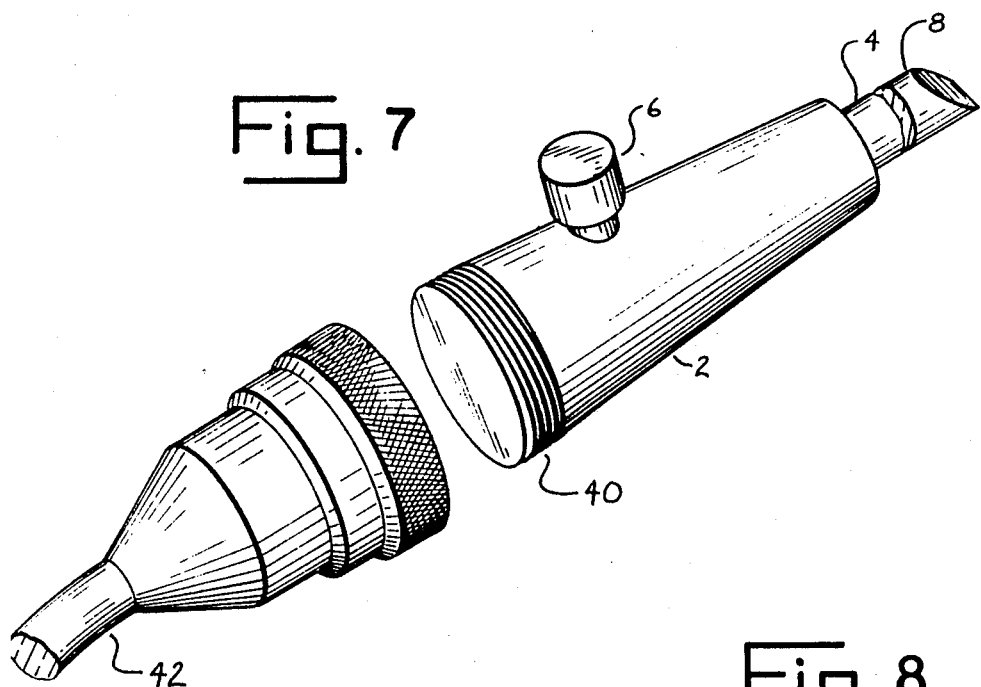
FIG. 7 is a perspective view of another embodiment of this invention.

FIG. 6 is a partial sectional view of another embodiment of head 2 showing light gathering surface 18 as a flat and internal cavity surface 28 as a flat. To this head will be applied eye piece 6 and shank 4. FIG. 7 is a perspective view of an embodiment of this invention showing head 2 adapted to receive a fiber optic cable as a light source at surface 18. Head 2 is provided with attachment means, such as a thread 40. Fiber optic cable 42 carries light from a remote source to the scope of this invention and is provided with a complemental threaded sleeve for attachment to head 2. In some applications of this invention it may be preferable to omit the eye piece 6 from the head 2. In such an embodiment internal optical surface 24 would then be the viewing surface, as illustrated in FIG. 6.

Figure 8:
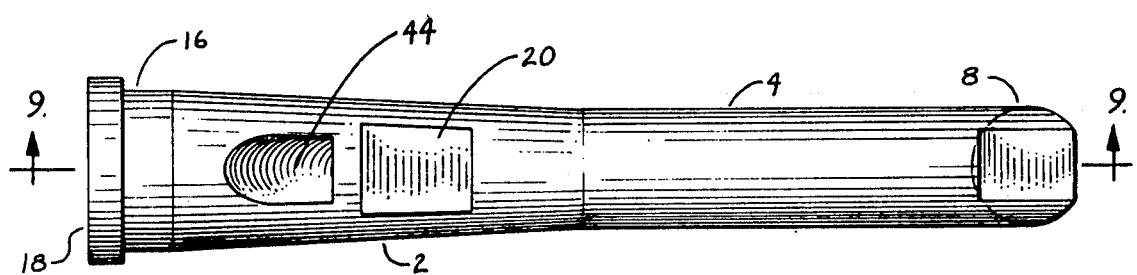
FIG. 8 is an elevation view of yet another embodiment of this invention.
Figure 9:
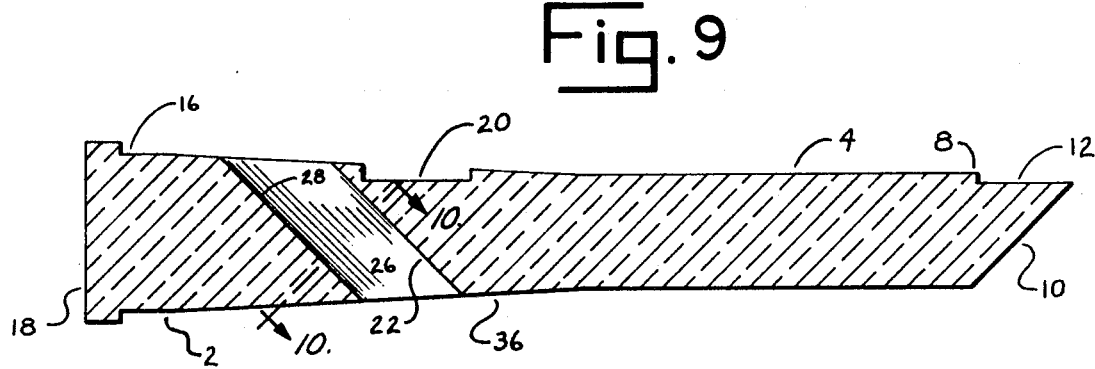
FIG. 9 is a sectional view of the scope shown in FIG. 8 taken along the line 9—9 and looking in the direction of the arrows.
Figure 10:
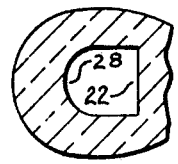
FIG. 10 is a sectional view taken along the line 10—10 of FIG. 9 and looking in the direction of the arrows.

Yet another embodiment of this invention is shown in FIGS. 8–10. In this embodiment, internal cavity 26 is formed in head 2 by an oblique hole 44. Internal optical surface 22 is formed by a flat edge of this hole extending obliquely through head 2 to form a plane. Viewing surface 20 is an externally formed flat on head 2. Internal cavity surface 28, seen in FIG. 10, may be an arcuate surface as shown, or may have other contours.

In the embodiments above described, the head, shank, and eye piece components may be separately formed for ease of manufacture. It is to be understood that this invention is not to be limited to the details herein given but that it may be modified within the scope of the appended claims.

What I claim is:

1. A scope for viewing the internal surface of a bore or similar cavity comprising a rod formed of optically clear material having a head, a viewing surface, a shank, and an image transmitting end; said head having a light gathering end with a light gathering surface; said head having an internally formed cavity with a first cavity surface and a second cavity surface; said first cavity surface defining an internal optical surface extending obliquely to the axis of said rod; said viewing surface disposed oppositely to said internal optical surface; said viewing surface generally paralleling the axis of said rod; said head having a surface portion extending toward said shank wherein image producing light incident upon the light gathering surface of said head is transmitted by said surface portion into said shank and toward said image transmitting end; said second cavity surface defining means for directing image producing light incident thereupon toward said surface portion of the head and into said shank to said image transmitting end; said image transmitting end defining means for directing said image producing light transmitted therein toward and onto said cavity surface with the image of said cavity surface produced thereby being directed by the image transmitting end onto said internal optical surface of the head; said internal optical surface defining means for reflecting said image through said viewing surface.

2. The scope of claim 1 wherein said viewing surface is formed on an eye piece extending perpendicularly to the rod axis.

3. The scope of claim 1 wherein said image transmitting end has first and second optical surfaces, said first optical surface extending obliquely to the axis of said rod, said second optical surface paralleling the axis of said rod and located oppositely adjacent said first optical surface, the plane of said first optical surface so intersecting the plane of said second optical surface wherein image producing light when transmitted down said shank is reflected by said first optical surface through said second optical surface onto said cavity surface with the image of the cavity surface produced thereby being reflected by said first optical surface into the shank.

4. The scope of claim 1 wherein said image transmitting end has an end optical surface extending perpendicular to the axis of said rod, said end optical surface transmitting image producing light transmitted down said shank into said cavity in an axial direction, said optical surface transmitting the image of said cavity into the shank.

5. The scope of claim 1 wherein said head surface portion tapers toward said shank.

6. The scope of claim 1 wherein the light gathering surface of said head is arcuate.

7. The scope of claim 1 wherein said second cavity surface is arcuate.

8. The scope of claim 1 wherein said second cavity surface is planar.

9. The scope of claim 1 wherein said internally defined cavity of the head is defined by an oblique hole extending through the head, said internal optical surface being defined by a straight edge of said hole extending obliquely through said head to form a plane, said viewing surface being defined by a flat optical surface on the exterior of said head opposite said internal optical surface.

10. The scope of claim 1 wherein said head has formed on the light gathering end thereof means for attaching an external light source adjacent the said light gathering surface.

11. The scope of claim 10 wherein said external light source is a fiber optic cable.

* * * * *